United States Patent
Klode (10) Patent No.: US 9,933,059 B2
(45) Date of Patent: Apr. 3, 2018

(54) DUAL-RATE LINEAR ACTUATOR

(71) Applicant: GOODRICH CORPORATION, Charlotte, NC (US)

(72) Inventor: Harald Klode, Centerville, OH (US)

(73) Assignee: GOODRICH CORPORATION, Charlotte, NC (US)

(*) Notice: Subject to any disclaimer, the term of this patent is extended or adjusted under 35 U.S.C. 154(b) by 51 days.

(21) Appl. No.: 14/792,355

(22) Filed: Jul. 6, 2015

(65) Prior Publication Data
US 2017/0009858 A1 Jan. 12, 2017

(51) Int. Cl.
| F16H 25/22 | (2006.01) |
| F16H 25/20 | (2006.01) |
| F16D 65/16 | (2006.01) |
| F16D 121/24 | (2012.01) |
| F16D 125/40 | (2012.01) |

(52) U.S. Cl.
CPC ......... *F16H 25/2204* (2013.01); *F16D 65/16* (2013.01); *F16H 25/2021* (2013.01); *F16H 25/2056* (2013.01); *F16D 2121/24* (2013.01); *F16D 2125/40* (2013.01); *F16H 2025/2075* (2013.01); *F16H 2025/2078* (2013.01)

(58) Field of Classification Search
CPC .. F16D 2125/40; F16D 65/16; F16H 25/2021; F16H 25/22; F16H 25/2204; F16F 2232/04
See application file for complete search history.

(56) References Cited

U.S. PATENT DOCUMENTS

| 1,389,737 A * | 9/1921 | Burrows | B66F 3/10 254/102 |
| 2,338,271 A * | 1/1944 | Ulanet | H03J 1/14 74/422 |
| 4,590,816 A * | 5/1986 | Weyer | B60G 21/0553 74/424.89 |
| 5,144,851 A | 9/1992 | Grimm et al. | |
| 5,299,649 A * | 4/1994 | Sano | B62D 5/0448 180/400 |
| 5,899,114 A * | 5/1999 | Dolata | F16H 25/2204 74/424.85 |
| 6,095,293 A * | 8/2000 | Brundrett | F16D 55/36 188/18 A |
| 6,389,915 B1 | 5/2002 | Wngett | |

(Continued)

FOREIGN PATENT DOCUMENTS

| DE | 19705106 | 8/1998 |
| DE | 102005040204 | 2/2007 |
| EP | 0151788 | 8/1985 |

OTHER PUBLICATIONS

EP Search report dated Sep. 22, 2017 in EP Application No. 16178011.9.

*Primary Examiner* — Vishal R Sahni
(74) *Attorney, Agent, or Firm* — Snell & Wilmer, L.L.P.

(57) ABSTRACT

An electromechanical actuator (EMA) is provided. The EMA may comprise a ball nut having an annular geometry centered about an axis. A dual ball screw may be disposed radially inward from the ball nut and configured to rotate about the axis. The dual ball screw may also be mechanically coupled to the ball nut. A ball screw may be disposed radially inward from the ball nut and configured to rotate about the axis. The ball screw may also be mechanically coupled to the dual ball screw.

17 Claims, 5 Drawing Sheets

(56) References Cited

U.S. PATENT DOCUMENTS

| | | | |
|---|---|---|---|
| 6,397,981 B1* | 6/2002 | Tamasho | B61H 1/00 |
| | | | 188/228.6 |
| 6,802,488 B1* | 10/2004 | Patterson | F16K 1/123 |
| | | | 251/129.11 |
| 7,225,694 B2 | 6/2007 | Said | |
| 7,870,803 B2* | 1/2011 | Schroeppel | F16H 25/2056 |
| | | | 74/89.34 |
| 7,980,973 B1* | 7/2011 | Starkey | F16H 63/062 |
| | | | 474/18 |
| 8,015,889 B2 | 9/2011 | Wingett et al. | |
| 9,371,895 B2* | 6/2016 | Pizzoni | F16H 25/2214 |
| 2007/0261926 A1* | 11/2007 | Dalton | B60T 13/746 |
| | | | 188/72.8 |
| 2010/0192715 A1* | 8/2010 | Vauchel | F02K 1/763 |
| | | | 74/89.35 |
| 2011/0132704 A1* | 6/2011 | Hanlon | B60T 7/042 |
| | | | 188/156 |
| 2015/0114150 A1* | 4/2015 | Drennen | F16H 25/2204 |
| | | | 74/89.23 |
| 2015/0115778 A1* | 4/2015 | Drennen | H02K 7/06 |
| | | | 310/68 B |
| 2015/0122061 A1* | 5/2015 | Drennen | F16H 25/2015 |
| | | | 74/89.23 |
| 2016/0207614 A1* | 7/2016 | Rehfus | B64C 25/44 |

\* cited by examiner

DUAL-RATE LINEAR ACTUATOR

FIELD

The present disclosure relates to actuators, and, more specifically, to an electromechanical actuator with multiple speeds.

BACKGROUND

Actuators used in aircraft braking typically cover a lead distance at zero force before reaching a brake surface. Once reaching the brake surface, the actuator applies force against the brake surface to effectuate braking. Typical electromechanical linear actuators may comprise a motor, reduction gear, and a ball screw assembly with a thrust bearing. The reduction gear ratio and ball screw lead constant may be fixed. Thus, a compromise may be made between the speed of the actuator and the force applied by the actuator under load. Gear shifting solutions may add components, controllers, and actuators that increase system complexity. A more complex system may have more failure points and increased weight than a less complex system.

SUMMARY

According to various embodiments, an electromechanical actuator (EMA) may comprise a ball nut having an annular geometry centered about an axis. A dual ball screw may be disposed radially inward from the ball nut and configured to rotate about the axis. The dual ball screw may also be mechanically coupled to the ball nut. A ball screw may be disposed radially inward from the ball nut and configured to rotate about the axis. The ball screw may also be mechanically coupled to the dual ball screw.

In various embodiments, the ball nut may have a first lead constant, and the ball screw may have a second lead constant less than the first lead constant. A puck may be coupled to the ball screw, wherein the ball screw is configured to stop rotating in response to the puck contacting the mechanical load member. An effective lead constant of the EMA may be equal to a difference between the first lead constant and the second lead constant in response to the ball screw stopping rotation. The second lead constant may be within 5% of the first lead constant. A rotor may include a magnet and a stator electromagnetically coupled to the magnet. The rotor may move axially relative to the stator. A spring may be coupled to the ball screw and configured to position the ball screw relative to the ball nut.

According to various embodiments, a brake system may include a brake stack and an electromechanical actuator configured to apply force to the brake stack through a puck. The EMA may comprise a rotor configured to rotate about an axis and a dual ball screw mechanically coupled to the rotor. The dual ball screw may have an annular geometry, a threaded outer diameter, and a threaded inner diameter. A ball nut may be disposed radially outward from the dual ball screw with a first threaded surface mechanically coupled to the threaded outer diameter of the dual ball screw. An inner ball screw may be disposed radially inward from the dual ball screw with a second threaded surface mechanically coupled to the threaded inner diameter of the dual ball screw.

In various embodiments, the ball nut may have a first lead constant and the inner ball screw may have a second lead constant less than the first lead constant. The inner ball screw may be configured to stop rotating in response to the puck contacting the brake stack. An effective lead constant of the EMA may be equal to a difference between the first lead constant and the second lead constant in response to the inner ball screw stopping rotation. The second lead constant may be within 5% of the first lead constant. A magnet may be coupled to the rotor with a stator electromagnetically coupled to the magnet. The magnet may be configured to move axially relative to the stator. A spring may be coupled to the inner ball screw and configured to position the inner ball screw relative to the ball nut. A housing may encase the inner ball screw, the dual ball screw, and the ball nut with the ball nut fixedly coupled to the housing.

According to various embodiments, an actuation device may comprise a first threaded member having an annular geometry fixed about an axis. A second threaded member may be radially inward from the first threaded member and configured to rotate about the axis. The second threaded member may be mechanically coupled to the first threaded member. A third threaded member may be radially inward from the second threaded member. The third threaded member may also be configured to rotate about the axis with the third threaded member mechanically coupled to the second threaded member.

In various embodiments, the first threaded member may have a first lead constant and the third threaded member may have a second lead constant less than the first lead constant. The third threaded member may be configured to stop rotating in response to contacting a mechanical load member. An effective lead constant of the actuation device may be equal to a difference between the first lead constant and the second lead constant. The second lead constant may be within 5% of the first lead constant.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
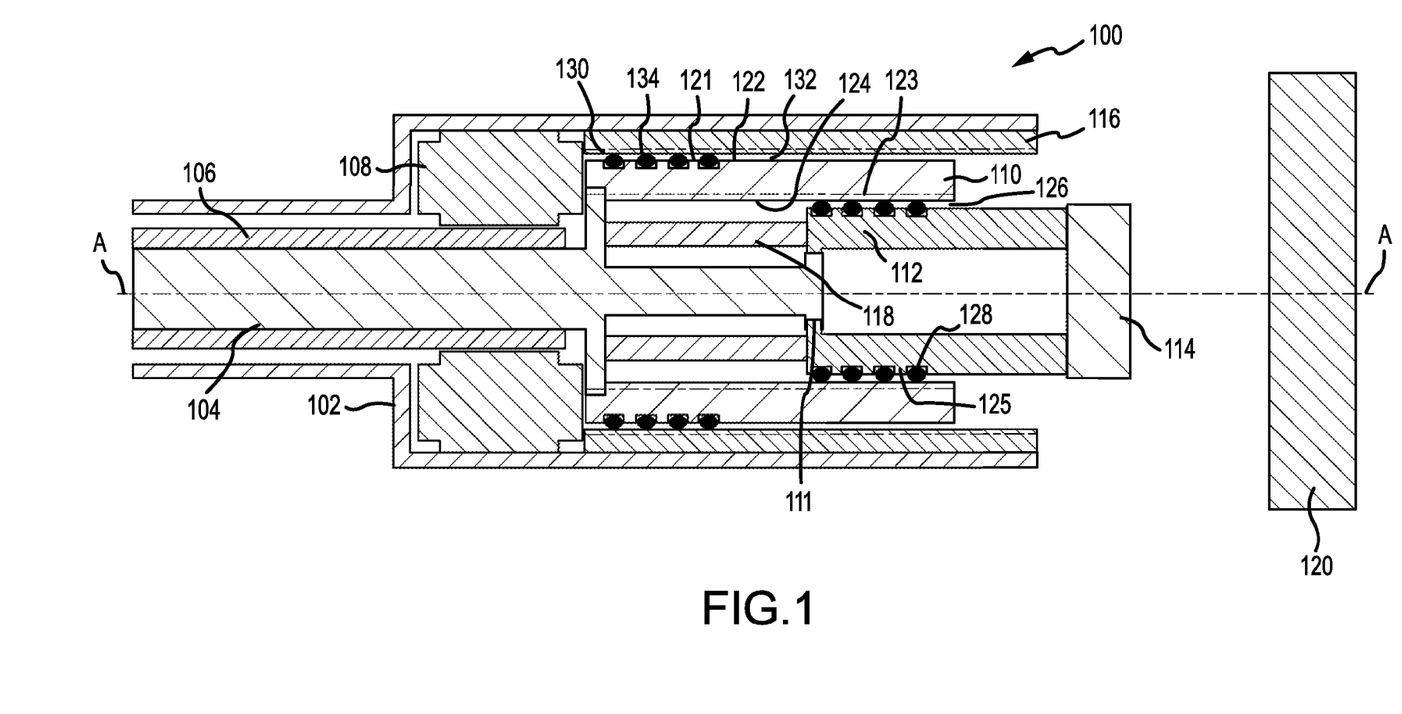
FIG. 1 illustrates an electromechanical actuator having a dual screw configuration in a retracted state, in accordance with various embodiments.

With reference to FIG. 1, an electromechanical actuator 100 (EMA) is shown in a retracted position and in proximity to mechanical load member 120 (e.g., a brake stack), in accordance with various embodiments. EMA 100 may have a housing 102 with cylindrical geometry surrounding internal components. Within housing 102, EMA 100 may include a rotor 104 configured to rotate about axis of rotation A. Rotor 104 may have magnets 106 mechanically coupled to rotor 104 and magnetically coupled to stator 108. Stator 108 may be electromagnetically coupled to magnets 106 by coils to convert electrical energy into rotational kinetic energy in rotor 104. Rotor 104 may be mechanically coupled to dual ball screw 110, which is also configured to rotate about axis A. Dual ball screw 110 may have a screw 121 (i.e., a threaded member) disposed about its outer diameter 122 and a nut 123 (i.e., a threaded member) disposed about its inner diameter 124. As used herein, a screw or nut may also be referred to as a threaded member.

In various embodiments, an inner ball screw 112 may be disposed radially inward from inner diameter 124 of dual ball screw 110. Inner ball screw 112 may have a thread 125 disposed about its outer diameter 126 and may be configured to rotate about axis A. Thread 125 may mechanically engage nut 123 through balls 128 and thereby enable relative axial movement between inner ball screw 112 and dual ball screw 110. A first ball re-circulation feature may be added to the outer threads of screw 210 and a second ball re-circulation feature may be added to the outer threads of inner ball screw 112 to provide for contained circulation of the balls in their respective screw track (or tracks) while the screws rotate. Spring 118 may provide a force to translate inner ball screw 112 axially towards mechanical load member 120 during use of EMA 100, as described in further detail below.

In various embodiments, an outer ball nut 116 may comprise an annular geometry and be disposed radially outward from dual ball screw 110 and inner ball screw 112. Outer ball nut 116 may have nut 130 disposed about an inner diameter 132 of outer ball nut 116. Nut 130 of outer ball nut 116 may mechanically engage screw 121 of dual ball screw 110 through balls 134 and thereby enable relative axial movement between dual ball screw 110 and outer ball nut 116. Outer ball nut 116 may be fixedly coupled to housing 102. Dual ball screw 110, inner ball screw 112, and outer ball nut 116 may thus each comprise threaded members config-ured to interface with one another as described herein. Stopping feature 111 may engage inner ball screw 110 and prevent inner ball screw 112 from extending beyond an intended extended position under residual spring torque.

Figure 2:
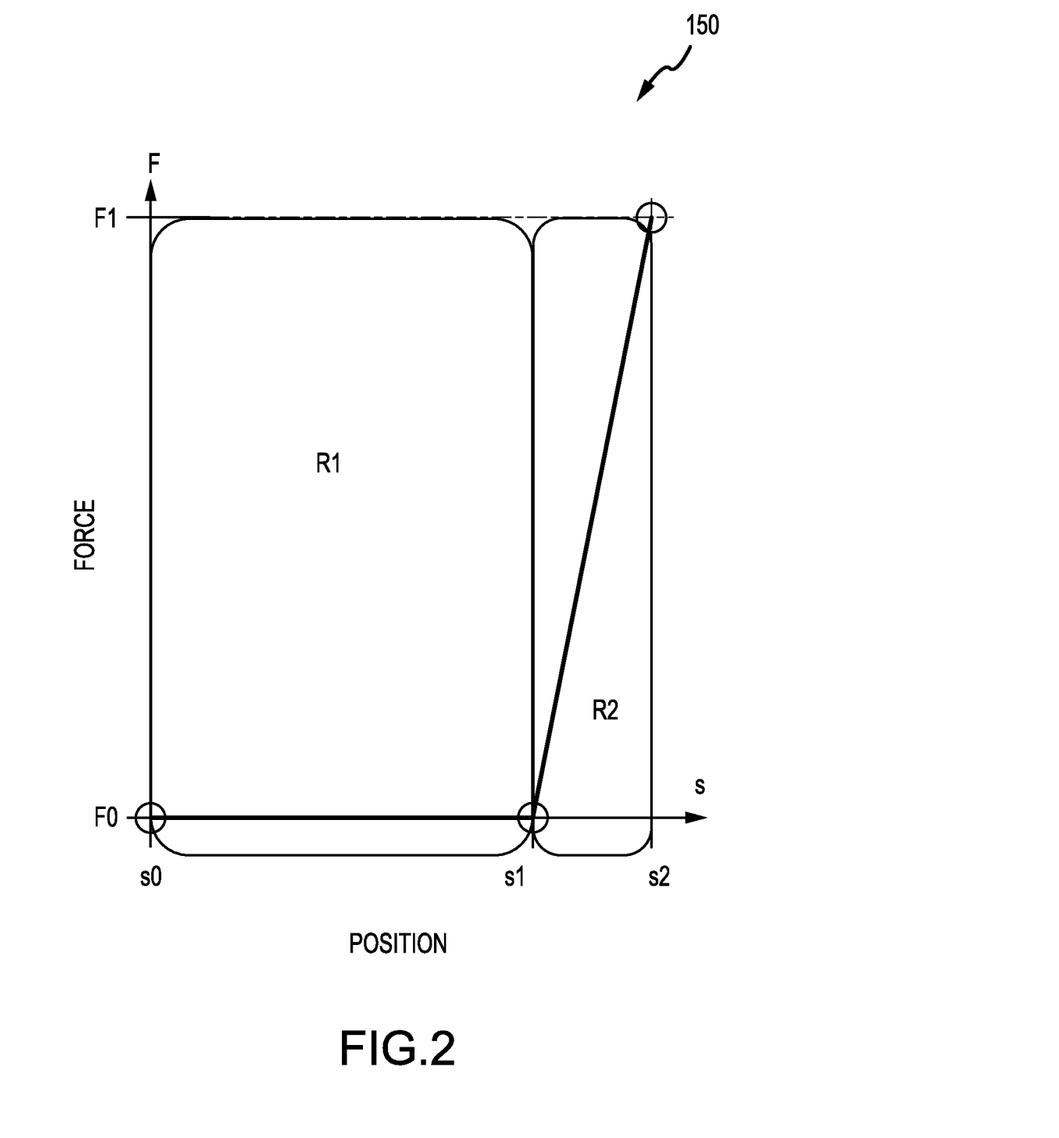
FIG. 2 illustrates a graphical representation of the force applied by a dual screw actuator during deployment, in accordance with various embodiments.

In various embodiments, EMA 100 may apply load by translating puck 114 axially towards mechanical load member 120 and applying force against mechanical load member 120 through puck 114. With reference to FIGS. 1 and 2, graph 150 plots the force F applied by EMA 100 against position s of puck 114 of EMA 100. EMA 100 is depicted in a retracted state at position s0 in FIG. 1. The force applied by EMA 100 as puck 114 is actuated axially towards mechanical load member 120 at position s0 is force F0. Force F0 denotes the force exerted by EMA 100 to actuate puck 114 through air.

Figure 3:
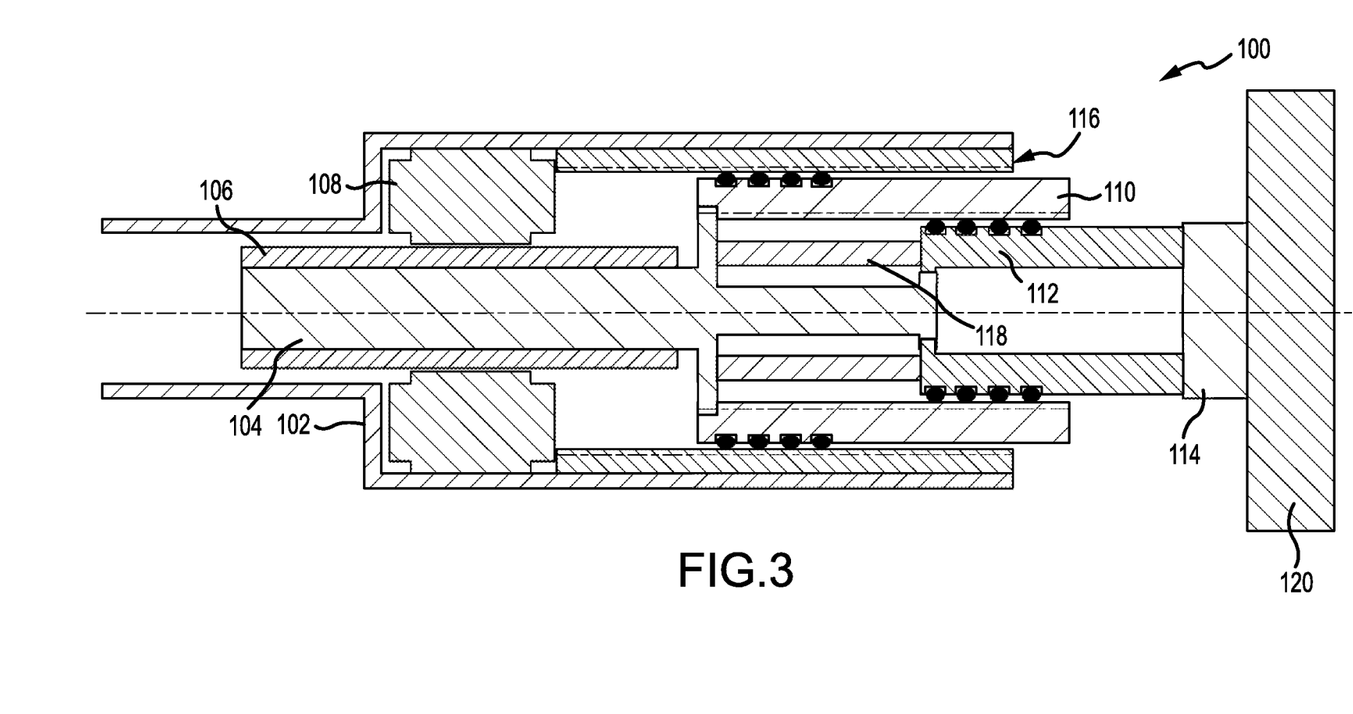
FIG. 3 illustrates an electromechanical actuator having a dual screw configuration in a partially deployed state, in accordance with various embodiments.

With reference to FIGS. 2 and 3, EMA 100 is depicted partially deployed at position s1 of graph 150 with puck 114 contacting mechanical load member 120, in accordance with various embodiments. Rotation of rotor 104 may turn and advance dual ball screw 110 along with inner ball screw 112 in an axial direction at a relatively high rate of travel determined by lead constant b1 of outer ball nut 116. A lead constant may describe a ball screw in terms of the axial distance traveled per angular rotation of rotor 104. The rate of travel of dual ball screw 110 and inner ball screw 112 relative to outer ball nut 116 may be determined by lead constant b1 as puck 114 of EMA 100 moves from position s0 to position s1.

In various embodiments, EMA 100 exerts force F0 while moving from position s0 to position s1. As puck 114 contacts and presses against mechanical load member 120, friction builds between mechanical load member 120 and puck 114. Inner ball screw 112 may rotate in response to the rotation of rotor 104 and dual ball screw 110 as EMA 100 moves from position s0 to position s1 and maintain its axial position relative to dual ball screw 110 from position s0 to position s1. Inner ball screw 112 may stop rotating in response to friction between puck 114 and mechanical load member 120 when sufficient friction has built. A reaction force between mechanical load member 120 and ball screw builds as puck 114 of EMA 100 moves from position s1 to position s2.

Figure 4:
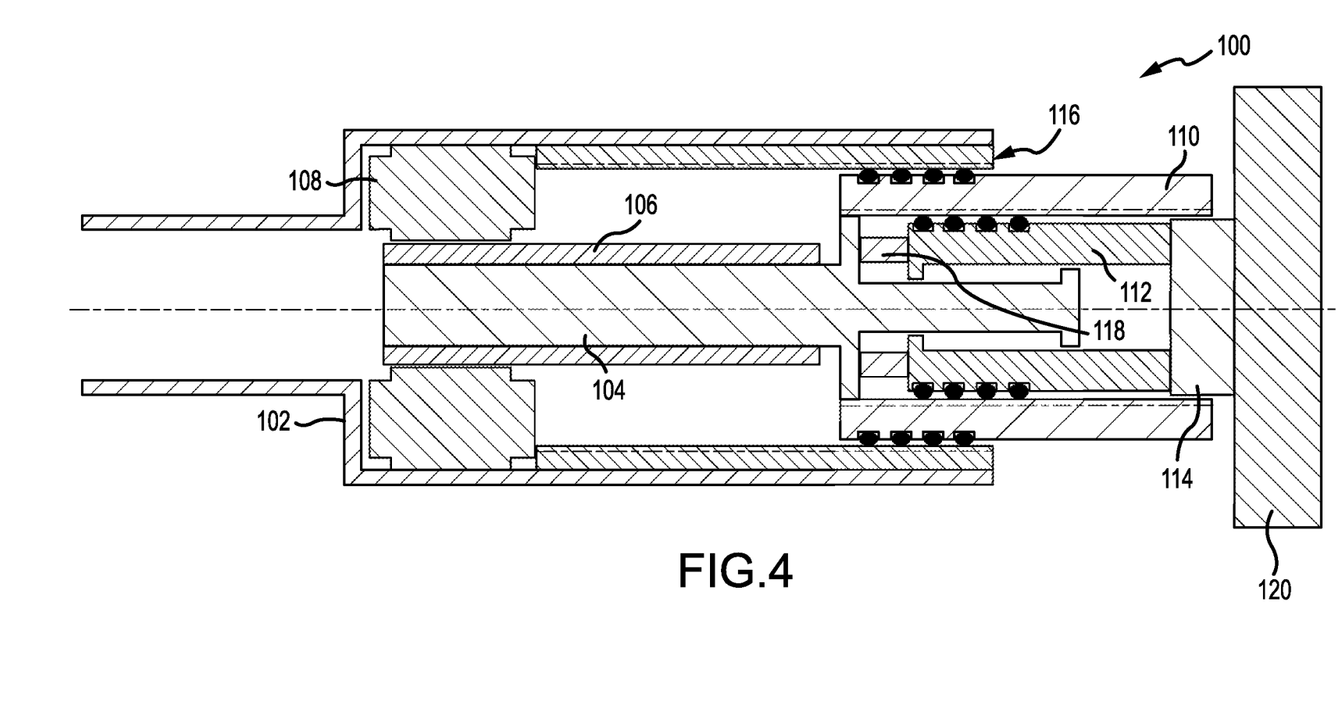
FIG. 4 illustrates an electromechanical actuator having a dual screw configuration in a fully applied state, in accordance with various embodiments.

With reference to FIGS. 2 and 4, EMA 100 is shown in a deployed position s2 on graph 150, in accordance with various embodiments. EMA 100 may apply greater force (increasing from force F0 to force F1) through puck 114 against mechanical load member 120 as EMA 100 moves from position s1 to position s2. The lead constant b1 for outer ball nut 116 may be selected to be slightly greater than the lead constant b2 of inner ball screw 112. For example, lead constant b2 may be within 5%, within 10%, or within 15% of lead constant b1. Inner ball screw 112 may be back-driven towards rotor 104 as EMA 100 moves from position s1 to position s2. In that regard, inner ball screw 112 may act as a thrust bearing that returns a torque opposite the drive torque provided by the EMA, thereby reducing the net torque required to turn rotor 104.

In various embodiments, the slope angle (i.e. lead constant) of the threads in outer ball nut 116 may further differ from the slope angle (i.e. lead constant) of the threads of inner ball screw 112 so that the effective lead constant b3 is equal to the difference between b1 and b2 (i.e., b3=b1−b2) in response to ceasing the rotation of inner ball screw 112. In that regard, the mechanical advantage of EMA 100 may increase to apply greater force in response to inner ball screw 112 ceasing rotation and dual ball screw 110 actuating axially toward mechanical load member 120. The dual ball screw configuration of EMA 100 provides a faster translation speed and lesser force as puck 114 of EMA 100 moves from s0 to s1 (across region R1) relative to a greater force and slower translation speed as puck 114 of EMA 100 moves from s1 to s2 (across region R2). EMA 100 may also provide the foregoing advantages without the use of a traditional gearbox. Stated another way, the linking of two ball screws with relatively large but slightly different lead constants creates a ball screw system with a new, much smaller virtual lead constant that is equal to the difference between the two individual lead constants.

In various embodiments, rotor 104 and dual ball screw 110 may translate axially toward mechanical load member 120 and compress spring 118 in response to EMA 100 moving from position s0 as shown in FIG. 1 to position s2 as shown in FIG. 4. The spring constant of spring 118 may be selected to provide sufficient expansive force to translate inner ball screw 112 axially relative to rotor 104 as EMA 100 retracts back from position s2 as shown in FIG. 4 to position s0 as shown in FIG. 1. In that regard, spring 118 provides a small pre-load relative to the force exerted by EMA 100 to assure that inner ball screw 112 is in a fully extended position as s0 as shown in FIG. 1.

Figure 5:
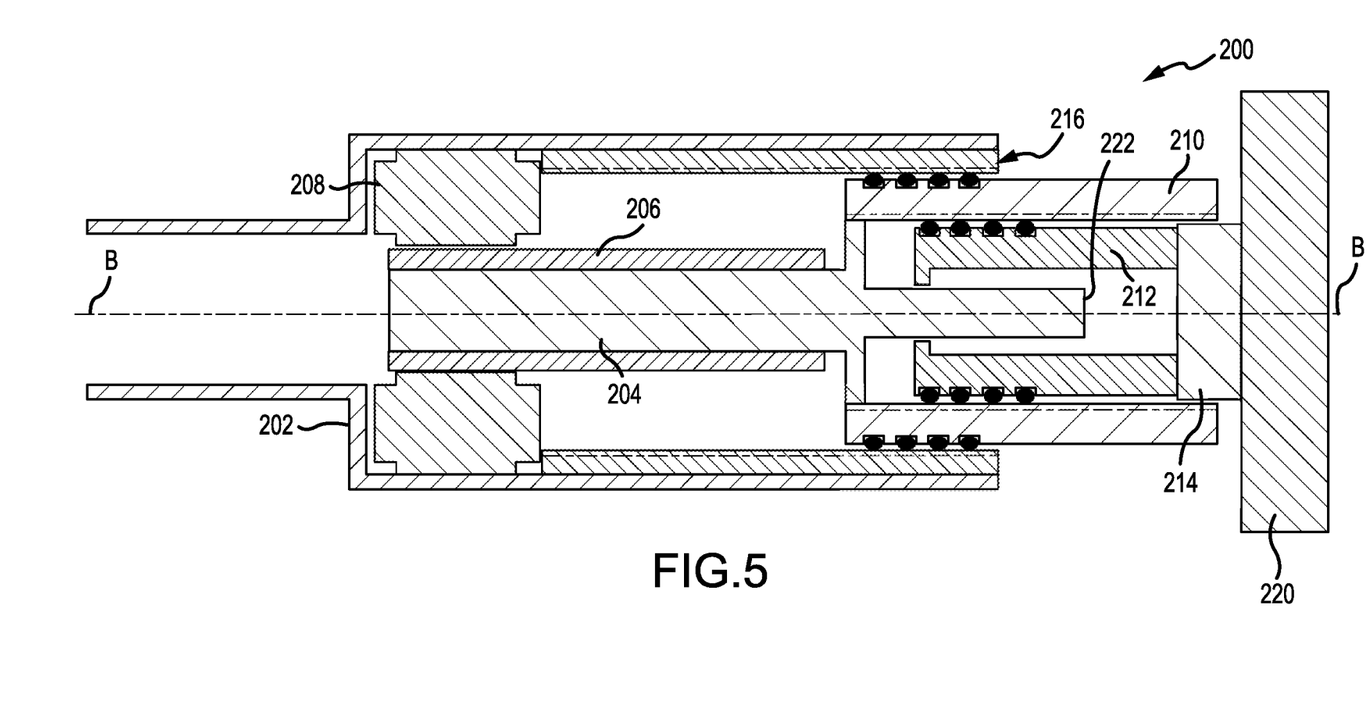
FIG. 5 illustrates an electromechanical actuator having an anti-rotation post, in accordance with various embodiments.

With reference to FIG. 5, an EMA 200 similar to EMA 100 of FIG. 1 is shown, in accordance with various embodiments. EMA 200 may have a housing 202 with cylindrical geometry surrounding internal components. Within housing 202, EMA 200 may include a rotor 204 configured to rotate about axis of rotation B. Rotor 204 may have magnets 206 mechanically coupled to rotor 204 and electromagnetically coupled to stator 208. Stator 208 may be electromagnetically coupled to magnets 206 by coils to convert electrical energy into rotational kinetic energy in rotor 204. Rotor 204 may be mechanically coupled to dual ball screw 210 and inner ball screw 212, which is also configured to rotate about axis B. A puck 214 may be coupled to inner ball screw 212. Stationary ball nut 216 may be disposed radially outward from dual ball screw 210. EMA 200 may comprise an anti-rotation post 222. The anti-rotation post 222 may prevent rotation of inner ball screw 212, thereby providing a mechanical advantage similar to that of EMA 100 of FIG. 4 at position s2 of FIG. 3.

The dual speed nature of EMAs described herein may enable relatively quiet operation compared to a traditional gear box. Similarly, the dual speed EMA may operate with fewer moving parts and less volume than an EMA including a standard gear box. Additionally, the nested threaded members may have fairly large lead constants and/or lead angles while maintaining a low effective lead angle as force is applied, for example, to a brake stack.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical actuator (EMA), comprising:
    a ball nut having an annular geometry centered about an axis;
    a dual ball screw disposed radially inward from the ball nut and configured to rotate about the axis in a first direction, the dual ball screw mechanically coupled to the ball nut;
    a ball screw disposed radially inward from the ball nut, wherein the ball screw rotates about the axis in the first direction, and is mechanically coupled to the dual ball screw; and
    a puck coupled to the ball screw, wherein the ball screw ceases rotation in response to the puck contacting a mechanical load member, and wherein the dual ball screw continues rotation in the first direction and translates towards the puck in response to the ball screw ceasing to rotate in the first direction,
    further comprising a spring coupled to the ball screw configured to position the ball screw relative to the ball nut and configured to apply force to a brake stack through the puck.

2. The EMA of claim 1, wherein the ball nut has a first lead constant and the ball screw has a second lead constant less than the first lead constant.

3. The EMA of claim 1, wherein an effective lead constant of the EMA is equal to a difference between the first lead constant and the second lead constant in response to the ball screw ceasing to rotate.

4. The EMA of claim 3, wherein the second lead constant is within 5% of the first lead constant.

5. The EMA of claim 3, further comprising:
a rotor comprising a magnet configured to rotate about the axis; and
a stator electromagnetically coupled to the magnet, the rotor configured to move axially relative to the stator.

6. The EMA of claim 1, wherein the dual ball screw comprises a threaded outer diameter and a threaded inner diameter.

7. A brake system, comprising:
a brake stack;
an electromechanical actuator (EMA) configured to apply force to the brake stack through a puck, wherein the EMA comprises:
  a rotor configured to rotate about an axis;
  a dual ball screw mechanically coupled to the rotor and comprising an annular geometry, the dual ball screw comprising a threaded outer diameter and a threaded inner diameter;
  a ball nut disposed radially outward from the dual ball screw, the ball nut comprising a first threaded surface mechanically coupled to the threaded outer diameter of the dual ball screw;
  an inner ball screw disposed radially inward from the dual ball screw, the inner ball screw comprising a second threaded surface mechanically coupled to the threaded inner diameter of the dual ball screw, wherein the dual ball screw is configured to continue rotation in response to the inner ball screw ceasing rotation; and
  a spring coupled to the inner ball screw and configured to position the inner ball screw relative to the ball nut.

8. The brake system of claim 7, wherein the ball nut has a first lead constant and the inner ball screw has a second lead constant less than the first lead constant.

9. The brake system of claim 8, wherein the inner ball screw is configured to stop rotating in response to the puck contacting the brake stack.

10. The brake system of claim 9, wherein an effective lead constant of the EMA is equal to a difference between the first lead constant and the second lead constant in response to the inner ball screw ceasing to rotate.

11. The brake system of claim 10, wherein the second lead constant is within 5% of the first lead constant.

12. The brake system of claim 10, further comprising:
a magnet coupled to the rotor; and
a stator electromagnetically coupled to the magnet with the magnet configured to move axially relative to the stator.

13. The brake system of claim 7, further comprising a housing encasing the inner ball screw, the dual ball screw, and the ball nut with the ball nut fixedly coupled to the housing.

14. An actuation device, comprising:
a first threaded member having an annular geometry and fixed about an axis;
a second threaded member disposed radially inward from the first threaded member, wherein the second threaded member rotates about the axis, and is mechanically coupled to the first threaded member; and
a third threaded member disposed inward from the second threaded member, wherein the third threaded member rotates about the axis in a first direction, and is mechanically coupled to the second threaded member, wherein the second threaded member continues rotation in the first direction in response to toe third threaded member screw ceasing rotation the first direction,
further comprising a spring coupled to the third threaded member and configured to position the third threaded member relative to the first threaded member and configured to apply force to a brake stack through a puck coupled to the third threaded member.

15. The actuation device of claim 14, wherein the first threaded member has a first lead constant and the third threaded member has a second lead constant less than the first lead constant.

16. The actuation device of claim 15, wherein the third threaded member is configured to stop rotating in response to contacting a mechanical load member.

17. The actuation device of claim 15, wherein an effective lead constant of the actuation device is equal to a difference between the first lead constant and the second lead constant.

* * * * *